United States Patent
Berman et al.

(10) Patent No.: US 7,522,680 B2
(45) Date of Patent: Apr. 21, 2009

(54) APPARATUS, SYSTEM, AND METHOD FOR ASYMMETRIC MAXIMUM LIKELIHOOD DETECTION

(75) Inventors: David Berman, San Jose, CA (US); Evangelos S. Eleftherion, Zurich (CH); Robert Allen Hutchins, Tucson, AZ (US); Glen Alan Jaquette, Tucson, AZ (US); Constantin M. Melas, Los Gatos, CA (US); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 11/054,060

(22) Filed: Feb. 9, 2005

(65) Prior Publication Data

US 2006/0176982 A1 Aug. 10, 2006

(51) Int. Cl.
*H04L 27/06* (2006.01)

(52) U.S. Cl. ........................ 375/341; 375/325; 375/230; 375/262; 375/222; 375/229; 714/794; 714/795

(58) Field of Classification Search ................. 375/341, 375/325, 230, 262, 222, 229; 714/794, 795
See application file for complete search history.

(56) References Cited

U.S. PATENT DOCUMENTS

| 5,852,630 | A | * | 12/1998 | Langberg et al. | ........... 375/219 |
|---|---|---|---|---|---|
| 6,337,889 | B1 | | 1/2002 | Mita et al. | ........... 375/341 |
| 6,426,926 | B1 | | 7/2002 | Sonu | |
| 6,483,297 | B2 | | 11/2002 | Sobey | |
| 6,483,793 | B1 | | 11/2002 | Kim | |
| 6,529,340 | B2 | | 3/2003 | Gowda et al. | |
| 6,587,292 | B1 | | 7/2003 | Ashley et al. | |
| 6,594,094 | B2 | | 7/2003 | Rae et al. | ........... 360/25 |
| 6,611,485 | B2 | | 8/2003 | Kim et al. | |
| 6,625,235 | B1 | | 9/2003 | Coker et al. | ........... 375/341 |
| 6,680,980 | B1 | | 1/2004 | Ashley et al. | ........... 375/265 |
| 6,735,724 | B1 | | 5/2004 | McClellan | ........... 714/704 |
| 2002/0064242 | A1 | | 5/2002 | Mita et al. | ........... 375/341 |
| 2003/0198169 | A1 | * | 10/2003 | Fujiwara et al. | ........... 369/59.22 |
| 2004/0156293 | A1 | | 8/2004 | Pozidis et al. | ........... 369/59.22 |

* cited by examiner

*Primary Examiner*—Shuwang Liu
*Assistant Examiner*—Kabir A Timory
(74) *Attorney, Agent, or Firm*—Kunzler & McKenzie (57) ABSTRACT

An apparatus, system, and method are disclosed for asymmetric maximum likelihood detection. An initialization module initializes a plurality of branch metrics and a plurality of path memories. A coefficient module calculates a plurality of coefficients. A computation module calculates a first and second specified likelihood function. A selection module calculates a third specified branch metric as the maximum of the first and second specified likelihood functions. A path metrics module calculates a third specified path memory from a first and second specified path memory. A results module identifies a data output value from one or more path memories.

22 Claims, 7 Drawing Sheets

APPARATUS, SYSTEM, AND METHOD FOR ASYMMETRIC MAXIMUM LIKELIHOOD DETECTION

BACKGROUND OF THE INVENTION

1. Field of the Invention

This invention relates to maximum likelihood detection and more particularly relates to maximum likelihood detection for an asymmetric input signal.

2. Description of the Related Art

During a read process of a data storage device, a read head is typically passed over a data record recorded on a storage media in order to convert the recorded data into an analog signal. For example, in a magnetic tape drive, a magneto-resistive read head ("MRRH") is passed over a data record that has been previously written as flux reversals on a magnetic tape. As the MRRH is passed over the tape, the MRRH converts the flux reversals into an electrical analog signal that represents the data originally stored on the magnetic tape.

An analog to digital converter ("ADC") periodically samples the analog signal and converts the sampled analog signal to a digital input signal. The ADC may sample and convert a plurality of digital input signals to create a digital waveform. The amplitude of the digital waveform is processed to form binary values. The data storage device such as a magnetic media storage device processes the digital waveform to reconstruct the data that was originally written to the tape.

Unfortunately, because of noise in the read channel, a binary value corresponding to one or more digital input signals may be indeterminate. For example, one or more of the digital input signals may have a lower amplitude, which is corrupted by noise, increasing the difficulty of reconstructing the data and determining the binary value.

Storage devices such as magnetic tape drives frequently use a maximum likelihood detector to reconstruct data from the digital waveform. The maximum likelihood detector employs a plurality of states organized as a logical trellis. The trellis specifies allowable subsequent states for each state. For example, the trellis may specify that the detector may change from a first state to a second or a third state, but not to a fourth state.

The detector changes from the first state to the second state or the third state in response to a plurality of branch metrics. A branch metric for the current state is a function of branch metrics for previous states and a current digital input signal. Path metrics maintain a record of the detector's progression through previous states. The detector begins in an initial state, and proceeds to change from state to state in response to the branch metrics, identifying the binary value for one or more digital input signals using information about previous and subsequent digital input values from the path metrics. As a result, the detector is better able to reconstruct data from digital input values.

Unfortunately, read head wear, read head asymmetries, and the like may produce an asymmetric analog signal. For example, the analog signal typically comprises alternating positive voltage and negative voltage pulses. Positive pulses may have a greater pulse amplitude than negative pulses or negative pulses may have a greater pulse amplitude than positive pulses if, for example, a read head is worn. Yet the typical maximum likelihood detector is not designed for the asymmetric digital waveform, increasing the probability that the detector will interpret the asymmetric digital input signals incorrectly and resulting in an increased number of data errors.

From the foregoing discussion, it should be apparent that a need exists for an apparatus, system, and method for maximum likelihood detection of asymmetric digital input signals. Beneficially, such an apparatus, system, and method would reduce data errors for read channels with asymmetries.

SUMMARY OF THE INVENTION

The present invention has been developed in response to the present state of the art, and in particular, in response to the problems and needs in the art that have not yet been fully solved by currently available maximum likelihood detection methods. Accordingly, the present invention has been developed to provide an apparatus, system, and method for asymmetric maximum likelihood detection that overcome many or all of the above-discussed shortcomings in the art.

The apparatus for asymmetric maximum likelihood detection is provided with a logic unit containing a plurality of modules configured to functionally execute the necessary steps of initializing branch metrics, initializing path memories, calculating coefficients, calculating likelihood functions, calculating branch metrics, calculating path memories, and identifying data output values. These modules in the described embodiments include a coefficient module, an initialization module, a metrics module, and a results module.

The coefficient module calculates a plurality of coefficients. The coefficients may be optimized for an asymmetric waveform. In one embodiment, the coefficients are calculated for each of a plurality of time slices. In an alternate embodiment, the coefficients are calculated once of the plurality of time slices.

The initialization module initializes a plurality of branch metrics. Each branch metric is used to calculate a likelihood function. In addition, the initialization module initializes a plurality of path memories. Each path memory is configured as a string of binary values. The path memories define a state of a plurality of possible apparatus states. Each state has one or more destination states. The states and the possible destination states of each state form a logical trellis. The path memories record the progression of the apparatus from state to state.

The metrics module includes a plurality of branch metric modules. Each branch metric module comprises a computation module and a selection module. Each computation module calculates a first specified likelihood function from a first specified branch metric, at least one coefficient, and a digital input signal of a read channel for the current time slice, and a second specified likelihood function from a second specified branch metric, at least one coefficient, and the digital input signal. Each selection module calculates a third specified branch metric as the maximum of the first and second specified likelihood functions.

The metrics module also includes a plurality of path metrics modules. Each path metrics module calculates a third specified path memory for the current time slice as a first specified path memory from a prior time slice shifted one bit if the first likelihood function is greater than the second likelihood function else as a second specified path memory from the prior time slice shifted one bit. The results module identifies a data output value from at least one path memory. In one embodiment, the results module identifies the data output value if two or more path memories converge. The apparatus identifies the data output value with a lower error rate for an asymmetric digital waveform of a read channel. In addition, the apparatus may support a plurality of read channel configurations by selecting appropriate coefficients.

A system of the present invention is also presented for asymmetric maximum likelihood detection. The system may be embodied in a data storage device such as a magnetic tape drive. In particular, the system, in one embodiment, includes a communication module, a control module, a write channel module, a write head, a read channel module comprising a maximum likelihood detector, a read head, and a storage media.

The control module controls the operation of the system. The communication module communicates with a host such as a storage device controller. The host stores data to the system and retrieves data from the system. The host may communicate data to the system through the communication module. The control module may direct the write channel module to record the data as an analog signal through the write head to the storage media.

The host may further communicate a request to retrieve data to the system through the communication module. The control module may direct the read channel module to process an analog signal received from a specified portion of the storage media through the read head. The read channel module converts the analog signal into a plurality of digital input signals forming a digital waveform. In addition, the read channel module employs the maximum likelihood detector to identify data from the digital waveform. The maximum likelihood detector includes a coefficient module, an initialization module, a metrics module, and a results module.

The initialization module initializes a plurality of path memories and branch metrics. The coefficient module calculates a plurality of coefficients. The metrics module includes a plurality of branch metric modules, each comprising a computation module and a selection module. The computation module calculates a first and second specified likelihood function. The selection module calculates a third specified branch metric as the maximum of the first and second specified likelihood functions. The metrics module also includes a plurality of path metrics modules that calculate a specified path memory. The results module identifies a data output value from at least one path memory of the current time slice.

A method of the present invention is also presented for asymmetric maximum likelihood detection. The method in the disclosed embodiments substantially includes the steps necessary to carry out the functions presented above with respect to the operation of the described apparatus and system. In one embodiment, the method includes initializing branch metrics, initializing path memories, calculating coefficients, calculating likelihood functions, calculating branch metrics, calculating path memories, and identifying data output values.

An initialization module initializes a plurality of branch metrics and a plurality of path memories. A coefficient module calculates a plurality of coefficients. A computation module calculates a first and second specified likelihood function. A selection module calculates a third specified branch metric of a current time slice as the maximum of the first and second specified likelihood functions. A path metrics module calculates a third specified path memory of the current time slice from a first and second path memory of a prior time slice. In one embodiment, a results module determines if two or more path memories converge. If the path memories converge, the results module identifies a data output value. If the path memories do not converge, the results module invalidates the data output value.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention identifies data output values from asymmetric digital waveforms using maximum likelihood detection. In addition, the present invention improves the error rate of maximum likelihood detection for asymmetric digital waveforms. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
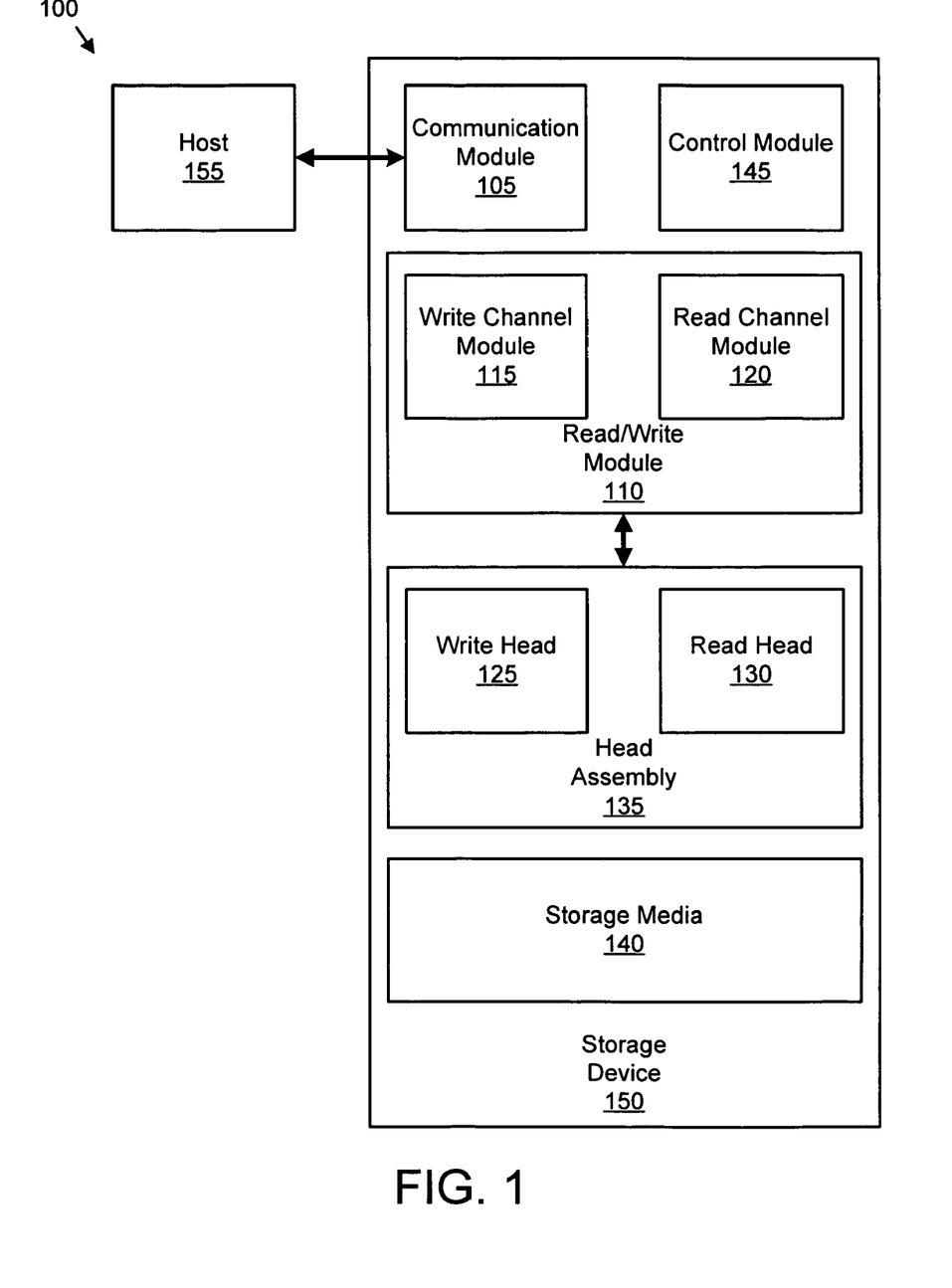
FIG. 1 is a schematic block diagram illustrating one embodiment of a data storage device system in accordance with the present invention.

FIG. 1 is a schematic block diagram illustrating one embodiment of a data storage device system 100 of the present invention. The system 100 includes a data storage device 150 comprising a communication module 105, a control module 145, a read/write module 110 including a write channel module 115 and a read channel module 120, a head assembly 135 comprising a write head 125 and a read head 130, and a storage media 140. In one embodiment, the system further includes a host 155.

The control module 145 controls the operation of the data storage device 150. In one embodiment, the control module 145 includes a random access memory storing instructions executed on a processor as is well known to those skilled in the art. The communication module 105, read/write module 110, head assembly 135, and storage media 140 may operate responsive to commands from the control module 145.

The communication module 105 communicates with the host 155. The host may be a storage device controller, a mainframe computer, a network router, or the like. The communication module 105 may comprise an Ethernet interface, a Fibre Channel interface, or the like. The host 155 stores data to the data storage device 150 and retrieves data from the data storage device 150. The host 155 may communicate data to the data storage device 150 through the communication module 105. The control module 145 may direct the write channel module 115 to record the data as an analog signal through the write head 125 to the storage media 140.

The host 155 may further communicate a request to retrieve data to the data storage device 150 through the communication module 105. The control module 145 may direct the read channel module 120 to process an analog signal received from a specified portion of the storage media 140 through the read head 130. The read channel 120 converts the analog signal into a plurality of digital input signals forming a digital waveform and identifies data from the digital waveform.

Figure 2:
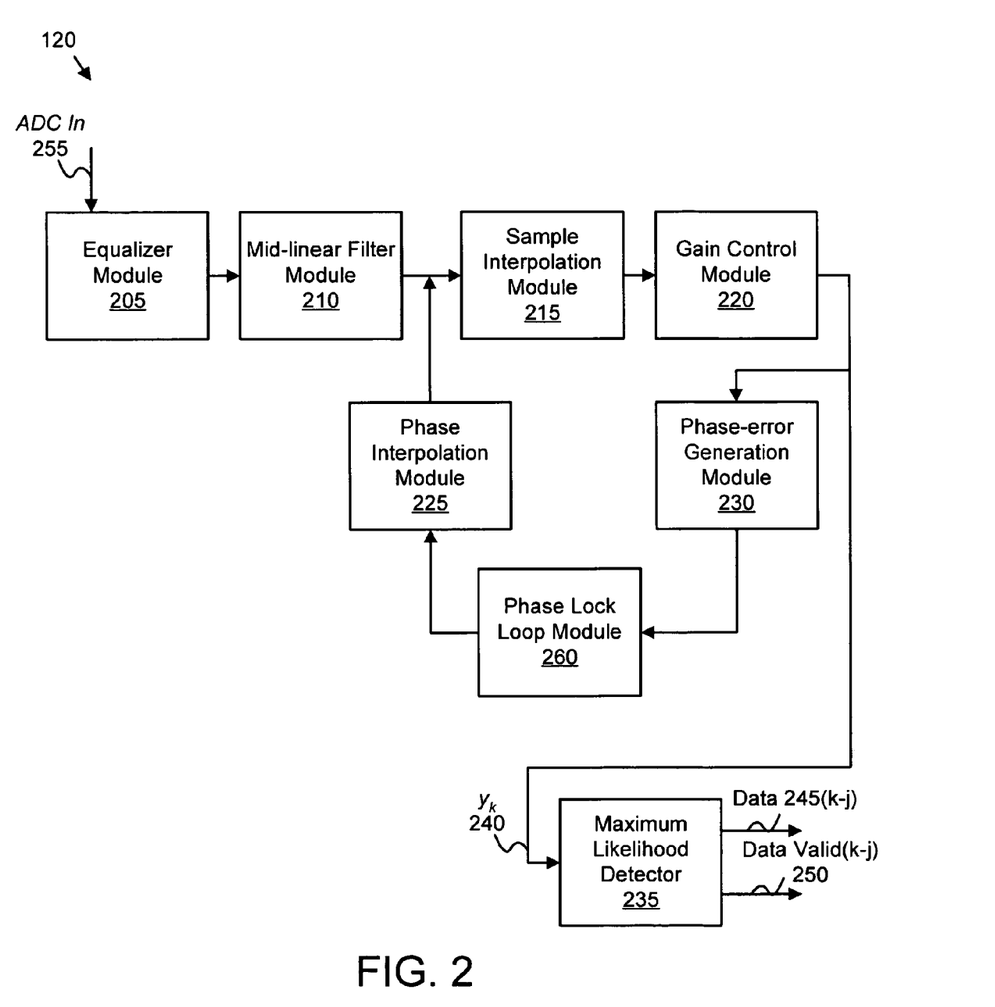
FIG. 2 is a schematic block diagram illustrating one embodiment of a read channel module of the present invention.

FIG. 2 is a schematic block diagram illustrating one embodiment of a read channel module 120 of the present invention. The read channel module 120 may be the read channel module 120 illustrated in FIG. 1. In the depicted embodiment, the read channel module 120 includes an equalizer module 205, a mid-linear filter module 210, a sample interpolation module 215, a gain control module 220, a phase interpolation module 225, a phase-error generation module 230, a phase-lock loop module 260, and a maximum likelihood detector 235.

The equalizer module 205, mid-linear filter module 210, sample interpolation module 215, gain control module 220, phase interpolation module 225, phase-error generation module 230, and phase-lock loop module 260 generate a digital input value 240 from a time slice of an analog input 255 as is well know by those skilled in the art. The read head 130 of FIG. 1 generates the analog input 255. The digital input value 240 may be represented as $y_k$ where k represents the current time slice of the digital input value 240.

The maximum likelihood detector 235 receives a plurality of digital input values 240 forming a digital waveform and generates a data output value 245 for one or more digital input values 240. In one embodiment, the maximum likelihood detector 235 generates one (1) data output value 245 for each of the digital input values 240. In addition, the maximum likelihood detector 235 may generate a data valid signal 250 that indicates if the data output value 245 is valid. The read channel module 120 generates a plurality of data output values 245 from an analog input 255.

Figure 3:
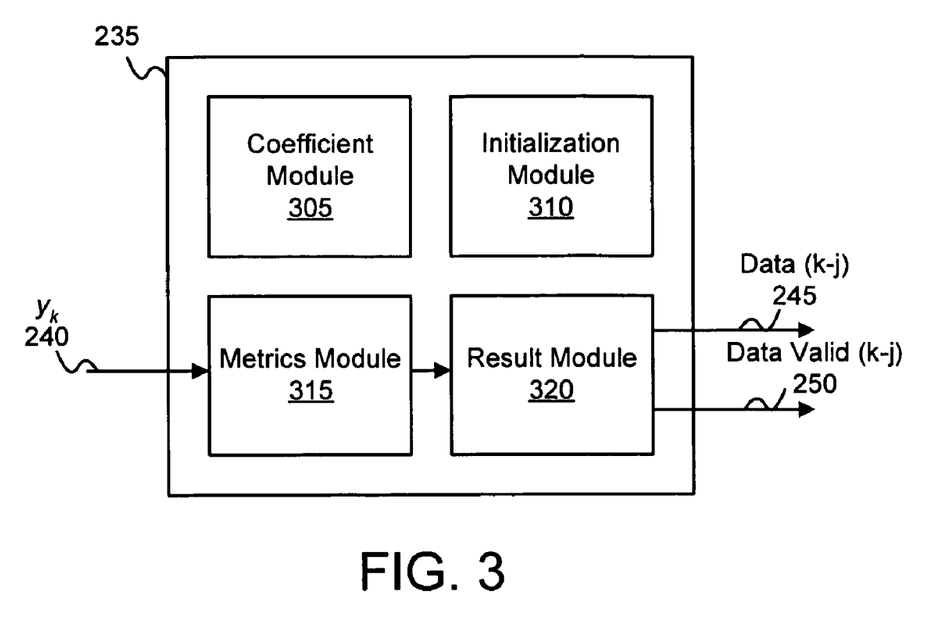
FIG. 3 is a schematic block diagram illustrating one embodiment of a maximum likelihood detector of the present invention.

FIG. 3 is a schematic block diagram illustrating one embodiment of a maximum likelihood detector 235 of the present invention. The maximum likelihood detector 235 may be the maximum likelihood detector 235 illustrated in FIG. 2. In the depicted embodiment, the maximum likelihood detector 235 includes a coefficient module 305, an initialization module 310, a metrics module 315, and a results module 320.

The coefficient module 305 calculates a plurality of coefficients. The metrics module 315 uses the coefficients to calculate a plurality of likelihood functions. The coefficients may be optimized for an asymmetric digital waveform. In one embodiment, the coefficients are calculated for each of a plurality of time slices. For example, the coefficient module 305 may calculate coefficients for each digital input signal 240 $y_k$ where k as used herein refers to a current time slice. In an alternate embodiment, the coefficients are calculated once for the plurality of digital input signals 240.

The initialization module 310 initializes a plurality of branch metrics. The metrics module 315 uses one or more branch metrics, one or more coefficients, and the digital input signal 240 to calculate each likelihood function. The initialization module 310 may initialize each branch metric to a specified value such as zero (0).

In addition, the initialization module 310 initializes a plurality of path memories. Each path memory is configured as a string of binary values. The path memories define a state of a plurality of possible metrics module 315 states. The metrics module 315 may progress from a first state to a second state. In one embodiment, the metrics module 315 may only progress from the first state to one or more specified states wherein the number of specified states are less than the number of possible states. For example, the metrics module 315 may progress from the first state to the second or third state, but not to any additional states.

The possible states and the possible destination states of each state form a logical trellis. The path memories record the progression of the metrics module 315 from state to state. The initialization module 310 may initialize the path memories to a specified state. The metrics module 315 calculates each path memory for the current time slice as a function of the likelihood functions and one or more path memories for prior time slices. In addition, the metrics module 315 calculates one or more branch metrics that are used in the calculation of likelihood functions for the subsequent time slice.

The results module 320 identifies a data output value 245 from at least one path memory. In one embodiment, the results module identifies the data output value 245 if two or more path memories converge. The maximum likelihood detector 235 identifies the data output value 245 with a lower error rate for an asymmetric read signal of a read channel module 120. In addition, the maximum likelihood detector 235 may support a plurality of read channel modules 120 by selecting appropriate coefficients.

Figure 4:
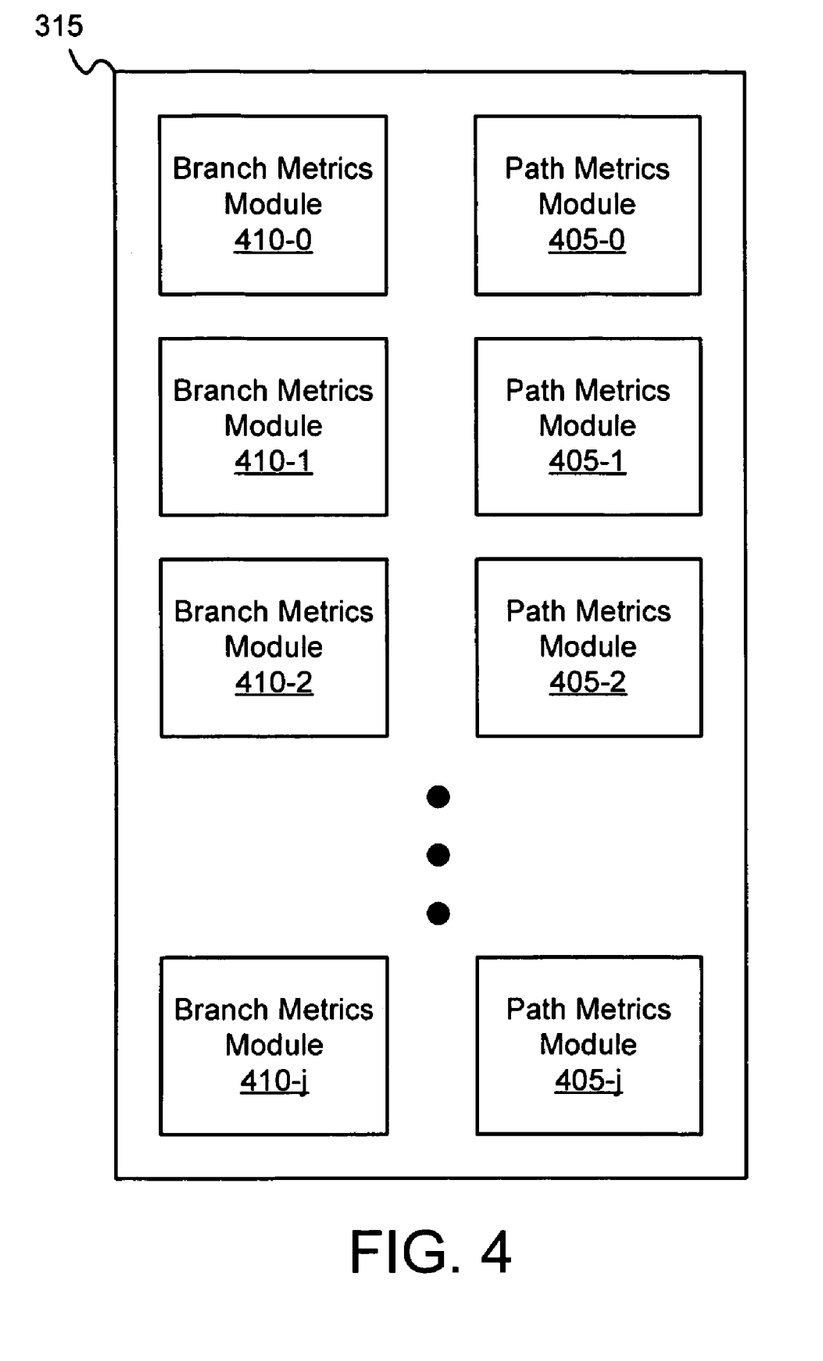
FIG. 4 is a schematic block diagram illustrating one embodiment of a metrics module of the present invention.

FIG. 4 is a schematic block diagram illustrating one embodiment of a metrics module 315 of FIG. 3. In the depicted embodiment, the metrics module 315 includes a plurality of branch metric modules 410 and a plurality of path metrics modules 405. The metrics module 315 is depicted with j plus one (j+1) of branch metric modules 410 and path metrics modules 405. In one embodiment, the metrics module 315 supports is j plus one (j+1) branch metrics and path memories.

Each branch metrics module 410 and path metrics module 405 may be fabricated of semiconductor gates. In addition, the branch metrics modules 410 and the path metrics modules 405 may be replicated from a standard branch metrics module 410 design and a standard path metrics module 405 design respectively, simplifying the development of a semiconductor metrics module 315.

Figure 5:
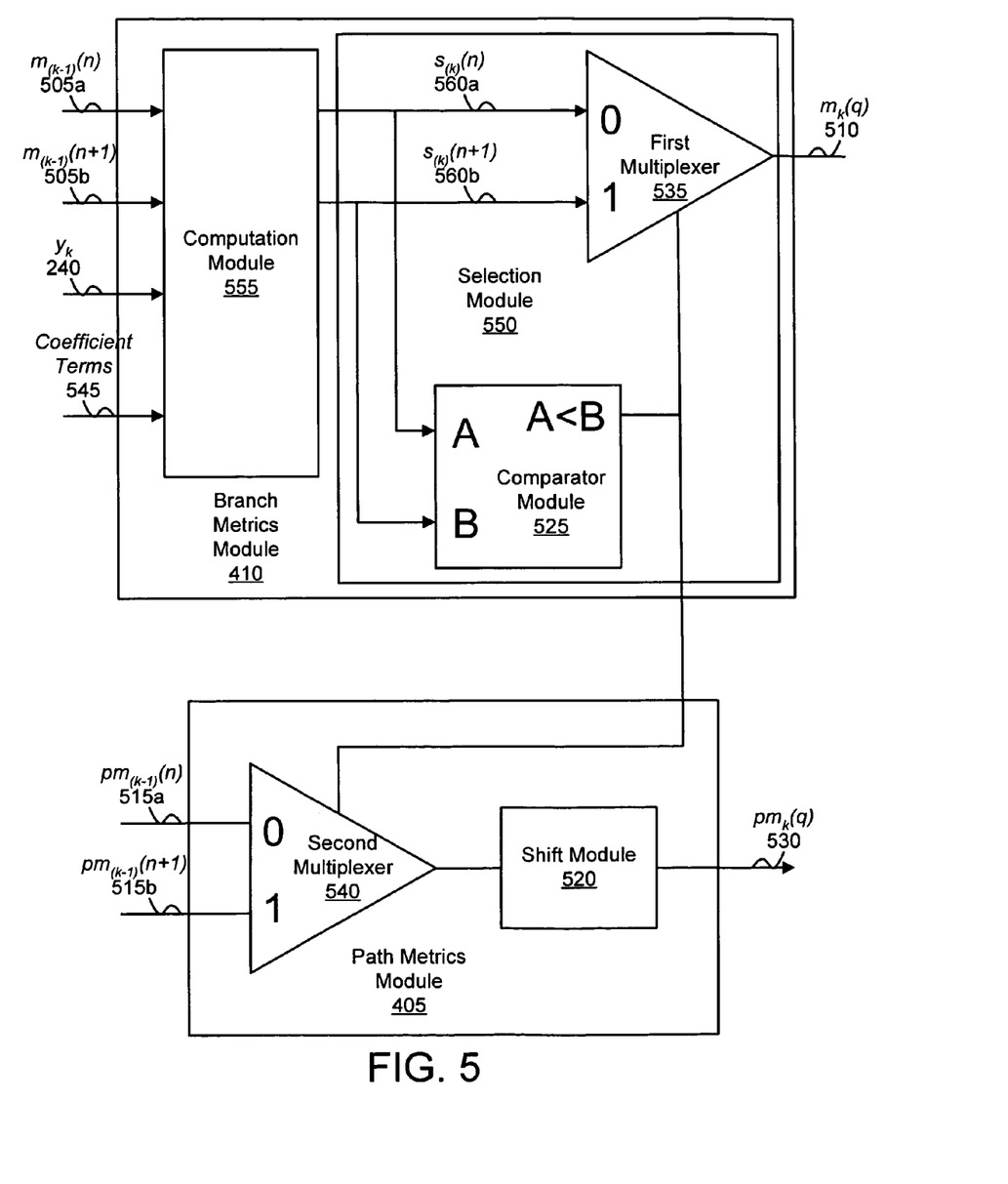
FIG. 5 is a schematic block diagram illustrating one embodiment of a branch metrics module and a path metrics module of the present invention.

FIG. 5 is a schematic block diagram illustrating one embodiment of a branch metrics module 410 and a path metrics module 405 of FIG. 4. As depicted, the branch metrics module 410 comprises a computation module 555 and a selection module 550. The computation module 555 calculates a first specified likelihood function 560a from a first specified branch metric 505a, at least one coefficient, and a digital input signal 240 $y_k$ of a read channel module 120, and a second specified likelihood function 560b from a second specified branch metric 505b, at least one coefficient, and the digital input signal 240 $y_k$.

The first specified likelihood function 560a is referred to herein as $s_{(k)}(n)$ and the second specified likelihood function 560b is referred to herein as $s_{(k)}(n+1)$. In addition, the first and second specified branch metrics 505a, 505b are referred to herein as $m_{(k-1)}(n)$ and $m_{(k-1)}(n+1)$ respectively. As used herein, n is an integer from zero to j that specifies likelihood functions 560, branch metrics 505, and path memories 515 and k minus one (k-1) refers to a time slice immediately prior to the current time slice.

The selection module 550 calculates a third specified branch metric 510 as the maximum of the first and second specified likelihood functions 560a, 560b. The third specified branch metric 510 is referred to herein as $m_{(k)}(q)$ where q is a specified integer from zero to j. The integers n and q are specified by one or more equations unique to each branch metrics module 410 and each path metrics module 405 of the metrics module 315 of FIG. 3. In the depicted embodiment, a comparator 525 determines the greater of the first and second likelihood functions 560a, 560b, and a first multiplexer 535 selects the greater of the first and second likelihood functions 560a, 560b as the third specified branch metric 510.

The path metrics module 405 calculates a third specified path memory 530 as a first specified path memory 515a from a prior time slice shifted one bit by the shift module 520 if the first likelihood function 560a is greater than or equal to the second likelihood function 560b else as a second specified path memory 515b from the prior time slice shifted one bit by the shift module 520. In one embodiment, the shift module 520 is configured as a shift register. The first specified path memory 515a, the second specified path memory 515b, and the third specified path memory 530 are also referred to herein as $pm_{(k-1)}(n)$, $pm_{(k-1)}(n+1)$, and $pm_{(k)}(q)$ respectively.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
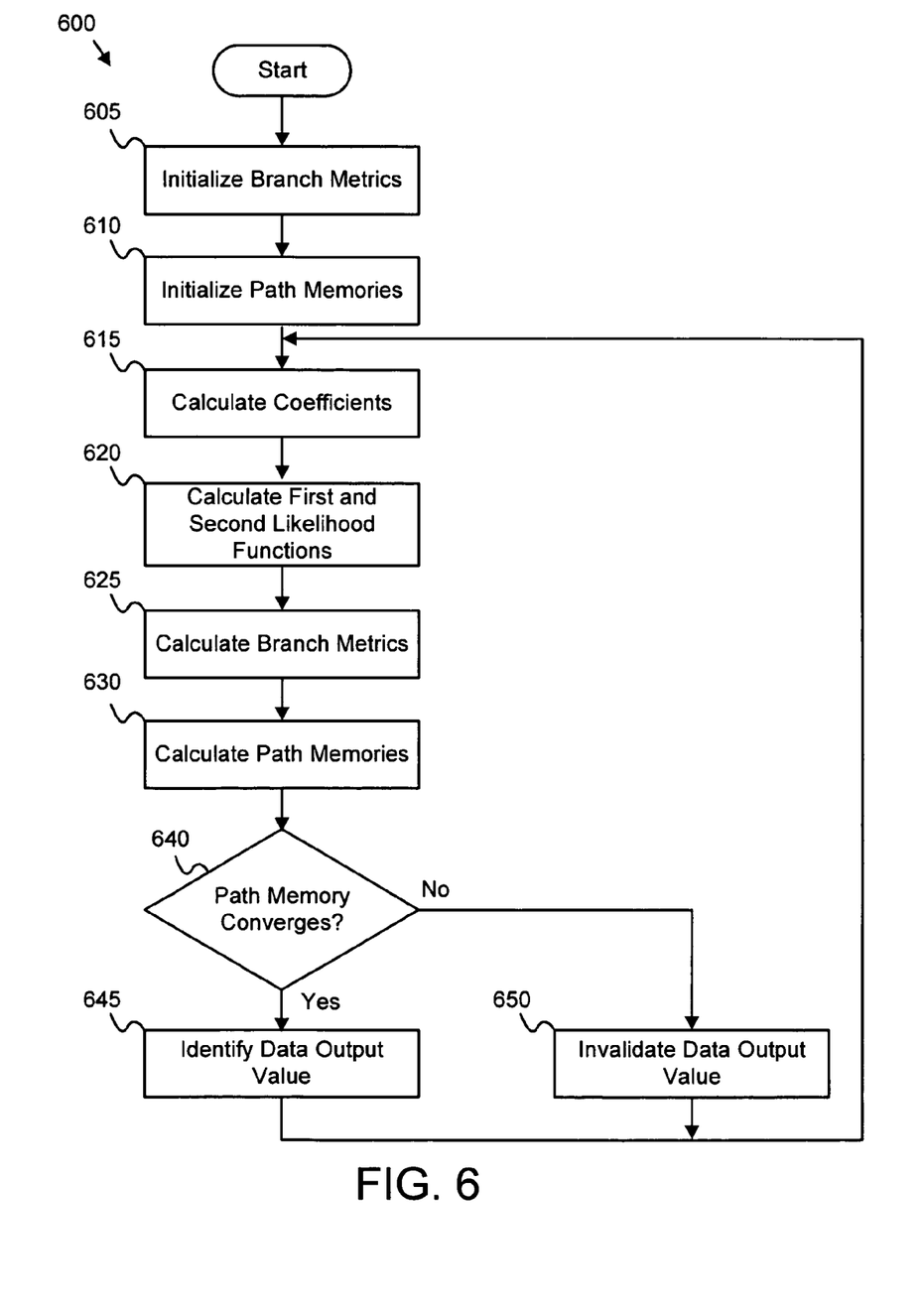
FIG. 6 is a schematic flow chart diagram illustrating one embodiment of an asymmetric maximum likelihood detection method in accordance with the present invention.

FIG. 6 is a schematic flow chart diagram illustrating one embodiment of an asymmetric maximum likelihood detection method 600 of the present invention. An initialization module 310 initializes 605 a plurality of branch metrics modules 410. In addition, the initialization module 310 initializes 610 a plurality of path metrics modules 405. In one embodiment, the branch metrics module 410 and the path metrics modules 405 represent a time slice prior to a first time slice of a digital input value 240.

A coefficient module 305 calculates 615 a plurality of coefficients $\mu_{n/r}$ wherein r is equal to zero (0) or one (1). In one embodiment, the coefficient module 305 calculates 615 the coefficients from parameters $h_0$, $h_1$, $h_2$, $h_3$, and $h_4$ as specified in equations 1 through 32.

$$\mu_{0/0}=0 \qquad \text{Equation 1}$$

$$\mu_{1/0}=h_4 \qquad \text{Equation 2}$$

$$\mu_{2/0}=h_3 \qquad \text{Equation 3}$$

$$\mu_{3/0}=h_3+h_4 \qquad \text{Equation 4}$$

$$\mu_{4/0}=h_2 \qquad \text{Equation 5}$$

$$\mu_{5/0}=h_2+h_4 \qquad \text{Equation 6}$$

$\mu_{6/0} = h_2 + h_3$     Equation 7

$\mu_{7/0} = h_2 + h_3 + h_4$     Equation 8

$\mu_{8/0} = h_1$     Equation 9

$\mu_{9/0} = h_1 + h_4$     Equation 10

$\mu_{10/0} = h_1 + h_3$     Equation 11

$\mu_{11/0} = h_1 + h_3 + h_4$     Equation 12

$\mu_{12/0} = h_1 + h_2$     Equation 13

$\mu_{13/0} = h_1 + h_2 + h_4$     Equation 14

$\mu_{14/0} = h_1 + h_2 + h_3$     Equation 15

$\mu_{15/0} = h_1 + h_2 + h_3 + h_4$     Equation 16

$\mu_{0/1} = h_0$     Equation 17

$\mu_{1/1} = h_0 + h_4$     Equation 18

$\mu_{2/1} = h_0 + h_3$     Equation 19

$\mu_{3/1} = h_0 + h_3 + h_4$     Equation 20

$\mu_{4/1} = h_0 + h_2$     Equation 21

$\mu_{5/1} = h_0 + h_2 + h_4$     Equation 22

$\mu_{6/1} = h_0 + h_2 + h_3$     Equation 23

$\mu_{7/1} = h_0 + h_2 + h_3 + h_4$     Equation 24

$\mu_{8/1} = h_0 + h_1$     Equation 25

$\mu_{9/1} = h_0 + h_1 + h_4$     Equation 26

$\mu_{10/1} = h_0 + h_1 + h_3$     Equation 27

$\mu_{11/1} = h_0 + h_1 + h_3 + h_4$     Equation 28

$\mu_{12/1} = h_0 + h_1 + h_2$     Equation 29

$\mu_{13/1} = h_0 + h_1 + h_2 + h_4$     Equation 30

$\mu_{14/1} = h_0 + h_1 + h_2 + h_3$     Equation 31

$\mu_{15/1} = h_0 + h_1 + h_2 + h_3 + h_4$     Equation 32

In one embodiment, the coefficient module 305 calculates the parameters to reduce the error rate of an asymmetric digital waveform wherein the maximum amplitude of positive voltage and negative voltage pulses are not symmetric. In a certain embodiment, the coefficient module 305 calculates the parameters from asymmetry values $p_1$, $p_2$, $p_3$, $n_0$, $n_1$, $n_2$, and $n_3$.

In one embodiment, the coefficient module 305 may support one or more read channels including partial response ("PR4"), extended partial response ("EPR4"), extended EPR4 ("EEPR4"), noise predictive maximum likelihood ("NPML") with one minus D (1–D) terms ("DNPML") and with one minus D squared (1–D²) terms ("D²NPML"), and asymmetric pulse maximum likelihood ("APML") channels. Table 1 specifies the parameter values for each channel.

TABLE 1

|  | PR4 | EPR4 | EEPR4 | DNPML | D²NPML | APML |
|---|---|---|---|---|---|---|
| $h_0$ | 1 | 1 | 1 | 1 | 1 | 1 |
| $h_1$ | 0 | 1 | 2 | $p_1 - 1$ | $p_1$ | $p_1 - n_0$ |
| $h_2$ | −1 | −1 | 0 | $p_2 - p_1$ | $p_2 - 1$ | $p_2 - n_1$ |
| $h_3$ | 0 | −1 | −2 | $p_3 - p_2$ | $-p_1$ | $p_3 - n_2$ |
| $h_4$ | 0 | 0 | −1 | $-p_3$ | $-p_2$ | $-n_3$ |

A computation module 555 calculates 620 a first and second specified likelihood function 560*a*, 560*b*. Each likelihood function 560 $s_k(n)$ may be specified by equation 33 where $y_k$ is the digital input value 240 for the current time slice, $m_{k-1}(n)$ is a branch metric 505 for the prior time slice, and $\mu_{n/r}$ is a coefficient.

$$s_k(n) = m_{k-1}(n) + 2\mu_{n/r} y_k - \mu_{n/r}^2 \quad \text{Equation 33}$$

A selection module 550 calculates 625 a third specified branch metric 510 as the maximum of the first and second specified likelihood functions 560*a*, 560*b*. In one embodiment, the computation module 555 and the selection module 550 together execute equation 34 for each third specified branch metric 510 $m_k(q)$.

$$m_k(q) = \max\{m_{k-1}(n) + 2\mu_{n/r} y_k - \mu_{n/0}^2; m_{k-1}(n-1) + 2\mu_{n+1/r} y_k - \mu_{n+1/r}^2\} \quad \text{Equation 34}$$

In one embodiment, sixteen (16) branch metrics modules 410 each comprising a computation module 555 and a selection module 550 each execute one of equations 35 through 50.

$$m_k(0) = \max\{m_{k-1}(0) + 2\mu_{0/0} y_k - \mu_{0/0}^2; m_{k-1}(1) + 2\mu_{1/0} y_k - \mu_{1/0}^2\} \quad \text{Equation 35}$$

$$m_k(1) = \max\{m_{k-1}(2) + 2\mu_{2/0} y_k - \mu_{0/0}^2; m_{k-1}(3) + 2\mu_{3/0} y_k - \mu_{3/0}^2\} \quad \text{Equation 36}$$

$$m_k(2) = \max\{m_{k-1}(4) + 2\mu_{4/0} y_k - \mu_{4/0}^2; m_{k-1}(5) + 2\mu_{5/0} y_k - \mu_{5/0}^2\} \quad \text{Equation 37}$$

$$m_k(3) = \max\{m_{k-1}(6) + 2\mu_{6/0} y_k - \mu_{6/0}^2; m_{k-1}(7) + 2\mu_{7/0} y_k - \mu_{7/0}^2\} \quad \text{Equation 38}$$

$$m_k(4) = \max\{m_{k-1}(8) + 2\mu_{8/0} y_k - \mu_{8/0}^2; m_{k-1}(9) + 2\mu_{9/0} y_k - \mu_{9/0}^2\} \quad \text{Equation 39}$$

$$m_k(5) = \max\{m_{k-1}(10) + 2\mu_{10/0} y_k - \mu_{10/0}^2; m_{k-1}(11) + 2\mu_{11/0} y_k - \mu_{11/0}^2\} \quad \text{Equation 40}$$

$$m_k(6) = \max\{m_{k-1}(12) + 2\mu_{12/0} y_k - \mu_{12/0}^2; m_{k-1}(13) + 2\mu_{13/0} y_k - \mu_{13/0}^2\} \quad \text{Equation 41}$$

$$m_k(7) = \max\{m_{k-1}(14) + 2\mu_{14/0} y_k - \mu_{14/0}^2; m_{k-1}(15) + 2\mu_{15/0} y_k - \mu_{15/0}^2\} \quad \text{Equation 42}$$

$$m_k(8) = \max\{m_{k-1}(0) + 2\mu_{0/1} y_k - \mu_{0/1}^2; m_{k-1}(1) + 2\mu_{1/1} y_k - \mu_{1/1}^2\} \quad \text{Equation 43}$$

$$m_k(9) = \max\{m_{k-1}(2) + 2\mu_{2/1} y_k - \mu_{2/1}^2; m_{k-1}(3) + 2\mu_{3/1} y_k - \mu_{3/1}^2\} \quad \text{Equation 44}$$

$$m_k(10) = \max\{m_{k-1}(4) + 2\mu_{4/1} y_k - \mu_{4/1}^2; m_{k-1}(5) + 2\mu_{5/1} y_k - \mu_{5/1}^2\} \quad \text{Equation 45}$$

$$m_k(11) = \max\{m_{k-1}(6) + 2\mu_{6/1} y_k - \mu_{6/1}^2; m_{k-1}(7) + 2\mu_{7/1} y_k - \mu_{7/1}^2\} \quad \text{Equation 46}$$

$$m_k(12) = \max\{m_{k-1}(8) + 2\mu_{8/1} y_k - \mu_{8/1}^2; m_{k-1}(9) + 2\mu_{9/1} y_k - \mu_{9/1}^2\} \quad \text{Equation 47}$$

$$m_k(13) = \max\{m_{k-1}(10) + 2\mu_{10/1} y_k - \mu_{10/1}^2; m_{k-1}(11) + 2\mu_{11/1} y_k - \mu_{11/1}^2\} \quad \text{Equation 48}$$

$$m_k(14)=\max\{m_{k-1}(12)+2\mu_{12/1}y_k-\mu_{12/1}^2; m_{k-1}(13)+2\mu_{13/1}y_k-\mu_{13/1}^2\}$$ Equation 49

$$m_k(15)=\max\{m_{k-1}(14)+2\mu_{14/1}y_k-\mu_{14/1}^2; m_{k-1}(15)+2\mu_{15/1}y_k-\mu_{15/1}^2\}$$ Equation 50

A path metrics module 405 calculates 630 a third specified path memory 530 $pm_k(q)$ from a first and second path memory 515a, 515b, $pm_{(k-1)}(n)$ and $pm_{(k-1)}(n+1)$. In one embodiment, the path metrics module 405 calculates 630 the third specified path memory 530 $pm_k(q)$ as a first specified path memory 515a from a prior time slice $pm_{(k-1)}(n)$ shifted one bit if the first likelihood function 560a $s_k(n)$ is greater than the second likelihood function 560b $s_k(n+1)$ else as a second specified path memory 515b from the prior time slice $pm_{(k-1)}(n+1)$ shifted one bit.

For example, if the first path memory 515a is a string of binary values '0010110101101011010001110011011010001' and the second path memory 515b is a string of binary values '0010110111101000010001100110100' and if the first likelihood function 560a is greater than the second likelihood function 560b, then the third specified path memory 530 is the first path memory 515a shifted by one bit or '0001011010110101101010001110011010.'

In one embodiment, a results module 320 determines 640 if two or more third specified path memories 530 converge. If the path memories 530 converge, the results module 320 identifies 645 a data output value 245. If the path memories 530 do not converge, the results module 320 may invalidate the data output value 245. The method 600 determines data output values for the digital waveform including asymmetric digital waveforms of a read channel module 120.

Figure 7:
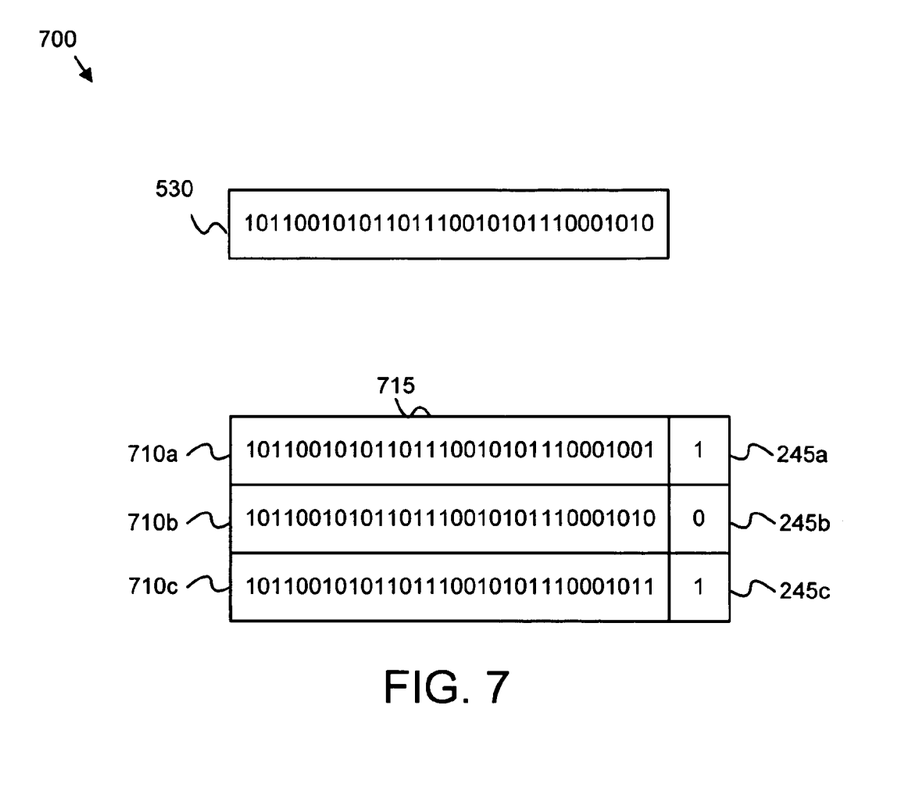
FIG. 7 is a schematic block diagram illustrating one embodiment of a data identification method in accordance with the present invention.

FIG. 7 is a schematic block diagram illustrating one embodiment of a data identification method 700 of the present invention. A specified path memory 530 such as the third specified path memory 530 of FIG. 5 is depicted. The path memory 530 is compared with a plurality of path memory records 710. Although for simplicity three path memory records 710 are depicted, there may be a path memory 710 for each possible value of the path memory 530.

Each path memory record 710 comprises a path memory value 715 and a digital output value 245. A results module 320 such as is depicted in FIG. 3 may determine the path memory value 715b matching the specified path memory 530 and select the corresponding data output value 245b as the data output value 245 for the maximum likelihood detector 235 of FIG. 2.

The present invention identifies 645 data output values 245 from asymmetric digital waveforms using maximum likelihood detection. In addition, the present invention improves the error rate of maximum likelihood detection for asymmetric digital waveforms. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for asymmetric maximum likelihood detection, the apparatus comprising:

a coefficient module comprising hardware circuits and configured to calculate a plurality of coefficients optimized for an asymmetric waveform;

an initialization module comprising hardware circuits and configured to initialize j plus one (j+1) path memories pm each configured as a string of binary values;

a metrics module comprising hardware circuits and:

a plurality of branch metric modules each comprising hardware circuits and:

a computation module comprising hardware circuits and configured to calculate j plus one (j+1) first specified likelihood functions m(n) as $m_{k-1}(n)+2\mu_{n/r}y_k-\mu_{n/r}^2$ and j plus one (j+1) second specified likelihood functions m(n+1) as $m_{k-1}(n+1)+2\mu_{n/r}y_k-\mu_{n/r}^2$ for each specified value of n from zero (0) to j, wherein k minus one (k−1) refers to the time slice immediately prior to the current time slice, $m_{(k-1)}(n)$ is the first specified branch metric $m_{(k-1)}(n+1)$ is the second specified branch metric for the prior time slice k for each specified value of n from zero (0) to j, r is a specified coefficient identifier, $y_k$ is a digital input value of a current time slice of a read channel analog value, and $\mu_{n/r}$ and $\mu_{n+1/r}$ are coefficients corresponding to m(n) and m(n+1); and a selection module comprising hardware circuits and that calculates j plus one (j+1) third specified branch metrics referred to as $m_k(q)$ where q is a specified integer from zero (0) to j as the maximum of the first and second specified likelihood functions;

a plurality of path metrics modules comprising hardware circuits and configured to calculate j plus one (j+1) third specified path memories $pm_k(q)$ for each q where q is the specified integer from zero (0) to j as the first specified path memory for the prior time slice $pm_{(k-1)}(n)$ shifted one bit if the first specified likelihood function is greater than the second specified likelihood function else as the second path memory for the prior time slice $pm_{(k-1)}(n+1)$ shifted one bit if the first likelihood function is less than the second likelihood function for each path memory $pm_{(k-1)}(n)$ for each specified value of n; and a results module comprising hardware circuits and configured to identify a data output value from at least one path memory.

2. The apparatus of claim 1, wherein j is equal to fifteen (15) and wherein the branch metrics modules calculate sixteen (16) branch metrics $m_k(q)$ using equations comprising:

$$m_k(0)=\max\{m_{k-1}(0)+2\mu_{0/0}y_k-\mu_{0/0}^2; m_{k-1}(1)+2\mu_{1/0}y_k-\mu_{1/0}^2\};$$

$$m_k(1)=\max\{m_{k-1}(2)+2\mu_{2/0}y_k-\mu_{2/0}^2; m_{k-1}(3)+2\mu_{3/0}y_k-\mu_{3/0}^2\};$$

$$m_k(2)=\max\{m_{k-1}(4)+2\mu_{4/0}y_k-\mu_{4/0}^2; m_{k-1}(5)+2\mu_{5/0}y_k-\mu_{5/0}^2\};$$

$$m_k(3)=\max\{m_{k-1}(6)+2\mu_{6/0}y_k-\mu_{6/0}^2; m_{k-1}(7)+2\mu_{7/0}y_k-\mu_{7/0}^2\};$$

$$m_k(4)=\max\{m_{k-1}(8)+2\mu_{8/0}y_k-\mu_{8/0}^2; m_{k-1}(9)+2\mu_{9/0}y_k-\mu_{9/0}^2\};$$

$$m_k(5)=\max\{m_{k-1}(10)+2\mu_{10/0}y_k-\mu_{10/0}^2; m_{k-1}(11)+2\mu_{11/0}y_k-\mu_{11/0}^2\};$$

$$m_k(6)=\max\{m_{k-1}(12)+2\mu_{12/0}y_k-\mu_{12/0}^2; m_{k-1}(13)+2\mu_{13/0}y_k-\mu_{13/0}^2\};$$

$$m_k(7)=\max\{m_{k-1}(14)+2\mu_{14/0}y_k-\mu_{14/0}^2; m_{k-1}(15)+2\mu_{15/0}y_k-\mu_{15/0}^2\};$$

$m_k(8)=\max\{m_{k-1}(0)+2\mu_{0/1}y_k-\mu_{0/1}^2; m_{k-1}(1)+2\mu_{1/1}y_k-\mu_{1/1}^2\};$ $m_k(9)=\max\{m_{k-1}(2)+2\mu_{2/1}y_k-\mu_{2/1}^2; m_{k-1}(3)+2\mu_{3/1}y_k-\mu_{3/1}^2\};$ $m_k(10)=\max\{m_{k-1}(4)+2\mu_{4/1}y_k-\mu_{4/1}^2; m_{k-1}(5)+2\mu_{5/1}y_k-\mu_{5/1}^2\};$ $m_k(11)=\max\{m_{k-1}(6)+2\mu_{6/1}y_k-\mu_{6/1}^2; m_{k-1}(7)+2\mu_{7/1}y_k-\mu_{7/1}^2\};$ $m_k(12)=\max\{m_{k-1}(8)+2\mu_{8/1}y_k-\mu_{8/1}^2; m_{k-1}(9)+2\mu_{9/1}y_k-\mu_{9/1}^2\};$ $m_k(13)=\max\{m_{k-1}(10)+2\mu_{10/1}y_k-\mu_{10/1}^2; m_{k-1}(11)+2\mu_{11/1}y_k-\mu_{11/1}^2\};$ $m_k(14)=\max\{m_{k-1}(12)+2\mu_{12/1}y_k-\mu_{12/1}^2; m_{k-1}(13)+2\mu_{13/1}y_k-\mu_{13/1}^2\};$ and $m_k(15)=\max\{m_{k-1}(14)+2\mu_{14/1}y_k-\mu_{14/1}^2; m_{k-1}(15)+2\mu_{15/1}y_k-\mu_{15/1}^2\}.$ 3. The apparatus of claim 2, wherein the coefficient module is further configured to calculate the plurality of coefficients from a plurality of parameters $h_0$, $h_1$, $h_2$, $h_3$, and $h_4$ as:

$\mu_{0/0}=0;$ $\mu_{1/0}=h_4;$ $\mu_{2/0}=h_3;$ $\mu_{3/0}=h_3+h_4;$ $\mu_{4/0}=h_2;$ $\mu_{5/0}=h_2+h_4;$ $\mu_{6/0}=h_2+h_3;$ $\mu_{7/0}=h_2+h_3+h_4;$ $\mu_{8/0}=h_1;$ $\mu_{9/0}=h_1+h_4;$ $\mu_{10/0}=h_1+h_3;$ $\mu_{11/0}=h_1+h_3+h_4;$ $\mu_{12/0}=h_1+h_2;$ $\mu_{13/0}=h_1+h_2+h_4;$ $\mu_{14/0}=h_1+h_2+h_3;$ $\mu_{15/0}=h_1+h_2+h_3+h_4;$ $\mu_{0/1}=h_0;$ $\mu_{1/1}=h_0+h_4;$ $\mu_{2/1}=h_0+h_3;$ $\mu_{3/1}=h_0+h_3+h_4;$ $\mu_{4/1}=h_0+h_2;$ $\mu_{5/1}=h_0+h_2+h_4;$ $\mu_{6/1}=h_0+h_2+h_3;$ $\mu_{7/1}=h_0+h_2+h_3+h_4;$ $\mu_{8/1}=h_0+h_1;$ $\mu_{9/1}=h_0+h_1+h_4;$ $\mu_{10/1}=h_0+h_1+h_3;$ $\mu_{11/1}=h_0+h_1+h_3+h_4;$ $\mu_{12/1}=h_0+h_1+h_2;$ $\mu_{13/1}=h_0+h_1+h_2+h_4;$ $\mu_{14/1}=h_0+h_1+h_2+h_3;$ and $\mu_{15/1}=h_0+h_1+h_2+h_3+h_4.$ 4. The apparatus of claim 3, wherein the read channel is an asymmetric pulse maximum likelihood (APML) channel and the plurality of parameters are calculated from a plurality of asymmetry values $p_1$, $p_2$, $p_3$, $n_0$, $n_1$, $n_2$, and $n_3$ wherein $h_0$ is one (1), $h_1$ is $p_1$ minus $n_0$ ($p_1-n_0$), $h_2$ is $p_2$ minus $n_1$ ($p_2-n_1$), $h_3$ is $p_3$ minus $n_2$ ($p_3-n_2$), and $h_4$ is minus $n_3$ ($-n_3$).

5. An apparatus for asymmetric maximum likelihood detection, the apparatus comprising:

a coefficient module comprising hardware circuits and configured to calculate a plurality of coefficients optimized for an asymmetric waveform;

an initialization module comprising hardware circuits and configured to initialize j plus one (j+1) path memories pm each configured as a string of binary values;

a metrics module comprising hardware circuits and:

a branch metric module comprising hardware circuits and:

a computation module comprising hardware circuits and configured to calculate j plus one (j+1) first specified likelihood functions m(n) as $m_{k-1}(n)+2\mu_{n/r}y_k-\mu_{n/r}^2$ and j plus one (j+1) second specified likelihood functions m(n+1) as $m_{k-1}(n+1)+2\mu_{n+1/r}y_k-\mu_{n+1/r}^2$ for each specified value of n from zero (0) to j, wherein k minus one (k−1) refers to the time slice immediately prior to the current time slice, $m_{(k-1)}(n)$ is the first specified branch metric, $m_{(k-1)}(n+1)$ is the second specified branch metric for the prior time slice k for each specified value of n from zero (0) to j, r is a specified coefficient identifier, $y_k$ is a digital input value of a current time slice of a read channel analog value, and $\mu_{n/r}$, and $\mu_{n+1/r}$ are coefficients corresponding to m(n) and m(n+1); and a selection module comprising hardware circuits and configured to calculate j plus one (j+1) third specified branch metrics referred to as $m_k(q)$ where q is a specified integer from zero (0) to j as the maximum of each first and second specified likelihood functions;

a path metrics module comprising hardware circuits and configured to calculate j plus one (j+1) third specified path memories $pm_k(q)$ for each q where q is the specified integer from zero (0) to j as the first specified path memory for the prior time slice $pm_{(k-1)}(n)$ shifted one bit if the first specified likelihood function is greater than the second specified likelihood function else as the second path memory for the prior time slice $pm_{(k-1)}(n+1)$ shifted one bit if the first likelihood function is less than the second likelihood function for each path memory $pm_{(k-1)}(n)$ for each specified value of n; and a results module comprising hardware circuits and configured to identify a data output value from at least one path memory.

6. A system for asymmetric maximum likelihood detection, the system comprising:
   a communication module comprising hardware circuits and configured to communicate with a host;
   a control module comprising hardware circuits and configured to control system functions;
   a write channel module comprising hardware circuits and configured to write data to a storage media through a write head;
   a read channel module comprising hardware circuits and configured to read data from the storage media through a read head and comprising:
      a coefficient module comprising hardware circuits and configured to calculate a plurality of coefficients optimized for an asymmetric waveform;
      an initialization module comprising hardware circuits and configured to initialize j plus one (j+1) path memories pm each configured as a string of binary values;
      a metrics module comprising hardware circuits and:
         a plurality of branch metrics modules each comprising hardware circuits and:
            a computation module comprising hardware circuits and configured to calculate j plus one (j+1) first specified likelihood functions m(n) as $m_{k-1}(n)+2\mu_{n/r}y_k-\mu_{n/r}^2$ j plus one (j+1) second specified likelihood functions m(n+1) as $m_{k-1}(n+1)+2\mu_{n+1/r}y_k-\mu_{n+1/r}^2$ for each specified value of n from zero (0) to j, wherein k minus one (K+1) refers to the time slice immediately prior to the current time slice, $m_{(k-1)}(n)$ is the first specified branch metric, $m_{(k-1)}(n+1)$ is the second specified branch metric for the prior time slice k for each specified value of n from zero (0) to j, r is a specified coefficient identifier, $y_k$ is a digital input value of a current time slice of a read channel analog value, and $\mu_{n/r}$, and $\mu_{n+1/r}$ are coefficients corresponding to m(n) and m(n+1); and
            a selection module comprising hardware circuits and configured to calculate j plus one (j+1) third specified branch metrics referred to as $m_k(q)$ where q is a specified integer from zero (0) to j as the maximum of the first and second specified likelihood functions;
         a plurality of path metrics modules comprising hardware circuits and configured to calculate j plus one (j+1) third specified path memories $pm_{(k-1)}(n)$ for each q where q is the specified integer from zero (0) to j as the first specified path memory for the prior time slice $pm_{(k-1)}(n)$ shifted one bit if the first specified likelihood function is greater than the second specified likelihood function else as the second path memory for the prior time slice $pm_{(k-1)}(n+1)$ shifted one bit if the first likelihood function is less than the second likelihood function for each path memory $pm_{(k-1)}(n)$ for each specified value of n ; and
         a results module comprising hardware circuits and configured to identify a data output value from at least one path memory of the current time slice.

7. The system of claim 6, wherein j is equal to fifteen (15) and wherein the branch metrics modules calculate sixteen (16) branch metrics $m_k(q)$ using equations comprising:

$m_k(0)=\max\{m_{k-1}(0)+2\mu_{0/0}y_k-\mu_{0/0}^2;m_{k-1}(1)+2\mu_{1/0}y_k-\mu_{1/0}^2\};$ $m_k(1)=\max\{m_{k-1}(2)+2\mu_{2/0}y_k-\mu_{2/0}^2;m_{k-1}(3)+2\mu_{3/0}y_k-\mu_{3/0}^2\};$ $m_k(2)=\max\{m_{k-1}(4)+2\mu_{4/0}y_k-\mu_{4/0}^2;m_{k-1}(5)+2\mu_{5/0}y_k-\mu_{5/0}^2\};$ $m_k(3)=\max\{m_{k-1}(6)+2\mu_{6/0}y_k-\mu_{6/0}^2;m_{k-1}(7)+2\mu_{7/0}y_k-\mu_{7/0}^2\};$ $m_k(4)=\max\{m_{k-1}(8)+2\mu_{8/0}y_k-\mu_{8/0}^2;m_{k-1}(9)+2\mu_{9/0}y_k-\mu_{9/0}^2\};$ $m_k(5)=\max\{m_{k-1}(10)+2\mu_{10/0}y_k-\mu_{10/0}^2;m_{k-1}(11)+2\mu_{11/0}y_k-\mu_{11/0}^2\};$ $m_k(6)=\max\{m_{k-1}(12)+2\mu_{12/0}y_k-\mu_{12/0}^2;m_{k-1}(13)+2\mu_{13/0}y_k-\mu_{13/0}^2\};$ $m_k(7)=\max\{m_{k-1}(14)+2\mu_{14/0}y_k-\mu_{14/0}^2;m_{k-1}(15)+2\mu_{15/0}y_k-\mu_{15/0}^2\};$ $m_k(8)=\max\{m_{k-1}(0)+2\mu_{0/1}y_k-\mu_{0/1}^2;m_{k-1}(1)+2\mu_{1/1}y_k-\mu_{1/1}^2\};$ $m_k(9)=\max\{m_{k-1}(2)+2\mu_{2/1}y_k-\mu_{2/1}^2;m_{k-1}(3)+2\mu_{3/1}y_k-\mu_{3/1}^2\};$ $m_k(10)=\max\{m_{k-1}(4)+2\mu_{4/1}y_k-\mu_{4/1}^2;m_{k-1}(5)+2\mu_{5/1}y_k-\mu_{5/1}^2\};$ $m_k(11)=\max\{m_{k-1}(6)+2\mu_{6/1}y_k-\mu_{6/1}^2;m_{k-1}(7)+2\mu_{7/1}y_k-\mu_{7/1}^2\};$ $m_k(12)=\max\{m_{k-1}(8)+2\mu_{8/1}y_k-\mu_{8/1}^2;m_{k-1}(9)+2\mu_{9/1}y_k-\mu_{9/1}^2\};$ $m_k(13)=\max\{m_{k-1}(10)+2\mu_{10/1}y_k-\mu_{10/1}^2;m_{k-1}(11)+2\mu_{11/1}y_k-\mu_{11/1}^2\};$ $m_k(14)=\max\{m_{k-1}(12)+2\mu_{12/1}y_k-\mu_{12/1}^2;m_{k-1}(13)+2\mu_{13/1}y_k-\mu_{13/1}^2\};$ and $m_k(15)=\max\{m_{k-1}(14)+2\mu_{14/1}y_k-\mu_{14/1}^2;m_{k-1}(15)+2\mu_{15/1}y_k-\mu_{15/1}^2\}.$ 8. The system of claim 7, wherein the coefficient module is further configured to calculate the plurality of coefficients from a plurality of parameters $h_0$, $h_1$, $h_2$, $h_3$, and $h_4$ as:

$\mu_{0/0}=0;$ $\mu_{1/0}=h_4;$ $\mu_{2/0}=h_3;$ $\mu_{3/0}=h_3+h_4;$ $\mu_{4/0}=h_2;$ $\mu_{5/0}=h_2+h_4;$ $\mu_{6/0}=h_2+h_3;$ $\mu_{7/0}=h_2+h_3+h_4;$ $\mu_{8/0}=h_1;$ $\mu_{9/0}=h_1+h_4;$ $\mu_{10/0}=h_1+h_3;$ $\mu_{11/0}=h_1+h_3+h_4;$ $\mu_{12/0}=h_1+h_2;$ $\mu_{13/0}=h_1+h_2+h_4;$ $\mu_{14/0}=h_1+h_2+h_3;$ $\mu_{15/0}=h_1+h_2+h_3+h_4;$ $\mu_{0/1}=h_0;$ $\mu_{1/1}=h_0+h_4;$ $\mu_{2/1}=h_0+h_3;$ $\mu_{3/1}=h_0+h_3+h_4;$ $\mu_{4/1}=h_0+h_2;$ $\mu_{5/1}=h_0+h_2+h_4;$ $\mu_{6/1}=h_0+h_2+h_3;$ $\mu_{7/1}=h_0+h_2+h_3+h_4;$ $\mu_{8/1}=h_0+h_1;$ $\mu_{9/1}=h_0+h_1+h_4;$ $\mu_{10/1}=h_0+h_1+h_3;$ $\mu_{11/1}=h_0+h_1+h_3+h_4;$ $\mu_{12/1}=h_0+h_1+h_2;$ $\mu_{13/1}=h_0+h_1+h_2+h_4;$ $\mu_{14/1}=h_0+h_1+h_2+h_3;$ and $\mu_{15/1}=h_0+h_1+h_2+h_3+h_4.$ 9. The system of claim 8, wherein the read channel is an asymmetric pulse maximum likelihood (APML) channel and the plurality of parameters are calculated from a plurality of asymmetry values $p_1$, $p_2$, $p_3$, $n_0$, $n_1$, $n_2$, and $n_3$ wherein $h_0$ is one (1), $h_1$ is $p_1$ minus $n_0$ ($p_1-n_0$), $h_2$ is $p_2$ minus $n_1$ ($p_2-n_1$), $h_3$ is $p_3$ minus $n_2$ ($p_3-n_2$), and $h_4$ is minus $n_3$ ($-n_3$).

10. A program of executable code stored on a computer readable medium, wherein the code executed by a processor to perform operations for asymmetric maximum likelihood detection, the operations comprising:

initializing j plus one (j+1) path memories pm each configured as a string of binary values;

calculating a plurality of coefficients optimized for an asymmetric waveform;

calculating j plus one (j+1) first specified likelihood functions m(n) as $m_{k-1}(n)+2\mu_{n/r}y_k-\mu_{n/r}^2$ and j plus one (j+1) second specified likelihood functions m(n+1) as $m_{k-1}(n+1)+2\mu_{n+1/r}y_k-\mu_{n+1/r}^2$ for each specified value of n from zero (0) to j, wherein k minus one (K+1) refers to the time slice immediately prior to the current time slice, $m_{(k-1)}(n)$ is the first specified branch metric, $m_{(k-1)}(n+1)$ is the second specified branch metric for the prior time slice k for each specified value of n from zero (0) to j, r is a specified coefficient identifier, $y_k$ is a digital input value of a current time slice of a read channel analog value, and $\mu_{n/r}$ and $\mu_{n+1/r}$ are coefficients corresponding to m(n) and m(n+1);

calculating j plus one (j+1) third specified branch metrics referred to as $m_k(q)$ where q is a specified integer from zero (0) to j as the maximum of the first and second specified likelihood functions;

calculating j plus one (j+1) third specified path memories $pm_k(q)$ for each q where q is the specified integer from zero (0) to j as the first specified path memory for the prior time slice $pm_{(k-1)}(n)$ shifted one bit if the first specified likelihood function is greater than the second specified likelihood function else as the second path memory for the prior time slice $pm_{(k-1)}(n)$ shifted one bit if the first likelihood function is less than the second likelihood function for each path memory $pm_{(k-1)}(n)$ for each specified value of n; and identifying a data output value of a read channel from the path memory of the current time slice.

11. The program of claim 10, further comprising operations to determine the data output value is valid if a plurality of path memories of the current time slice converge.

12. The program of claim 11, wherein j is equal to fifteen (15) and wherein the instructions further comprise operations to calculate sixteen (16) branch metrics $m_k(q)$ using equations comprising:

$m_k(0)=\max\{m_{k-1}(0)+2\mu_{0/0}y_k-\mu_{0/0}^2; m_{k-1}(1)+2\mu_{1/0}y_k-\mu_{1/0}^2\};$ $m_k(1)=\max\{m_{k-1}(2)+2\mu_{2/0}y_k-\mu_{2/0}^2; m_{k-1}(3)+2\mu_{3/0}y_k-\mu_{3/0}^2\};$ $m_k(2)=\max\{m_{k-1}(4)+2\mu_{4/0}y_k-\mu_{4/0}^2; m_{k-1}(5)+2\mu_{5/0}y_k-\mu_{5/0}^2\};$ $m_k(3)=\max\{m_{k-1}(6)+2\mu_{6/0}y_k-\mu_{6/0}^2; m_{k-1}(7)+2\mu_{7/0}y_k-\mu_{7/0}^2\};$ $m_k(4)=\max\{m_{k-1}(8)+2\mu_{8/0}y_k-\mu_{8/0}^2; m_{k-1}(9)+2\mu_{9/0}y_k-\mu_{9/0}^2\};$ $m_k(5)=\max\{m_{k-1}(10)+2\mu_{10/0}y_k-\mu_{10/0}^2; m_{k-1}(11)+2\mu_{11/0}y_k-\mu_{11/0}^2\};$ $m_k(6)=\max\{m_{k-1}(12)+2\mu_{12/0}y_k-\mu_{12/0}^2; m_{k-1}(13)+2\mu_{13/0}y_k-\mu_{13/0}^2\};$ $m_k(7)=\max\{m_{k-1}(14)+2\mu_{14/0}y_k-\mu_{14/0}^2; m_{k-1}(15)+2\mu_{15/0}y_k-\mu_{15/0}^2\};$ $m_k(8)=\max\{m_{k-1}(0)+2\mu_{0/1}y_k-\mu_{0/1}^2; m_{k-1}(1)+2\mu_{1/1}y_k-\mu_{1/1}^2\};$ $m_k(9)=\max\{m_{k-1}(2)+2\mu_{2/1}y_k-\mu_{2/1}^2; m_{k-1}(3)+2\mu_{3/1}y_k-\mu_{3/1}^2\};$ $m_k(10)=\max\{m_{k-1}(4)+2\mu_{4/1}y_k-\mu_{4/1}^2; m_{k-1}(5)+2\mu_{5/1}y_k-\mu_{5/1}^2\};$ $m_k(11)=\max\{m_{k-1}(6)+2\mu_{6/1}y_k-\mu_{6/1}^2; m_{k-1}(7)+2\mu_{7/1}y_k-\mu_{7/1}^2\};$ $m_k(12)=\max\{m_{k-1}(8)+2\mu_{8/1}y_k-\mu_{8/1}^2; m_{k-1}(9)+2\mu_{9/1}y_k-\mu_{9/1}^2\};$ $m_k(13)=\max\{m_{k-1}(10)+2\mu_{10/1}y_k-\mu_{10/1}^2; m_{k-1}(11)+2\mu_{11/1}y_k-\mu_{11/1}^2\};$ $m_k(14)=\max\{m_{k-1}(12)+2\mu_{12/1}y_k-\mu_{12/1}^2; m_{k-1}(13)+2\mu_{13/1}y_k-\mu_{13/1}^2\};$ and $m_k(15)=\max\{m_{k-1}(14)+2\mu_{14/1}y_k-\mu_{14/1}^2; m_{k-1}(15)+2\mu_{15/1}y_k-\mu_{15/1}^2\}.$ 13. The program of claim 12, further comprising operations to calculate the plurality of coefficients from a plurality of parameters.

14. The program of claim 13, further comprising operations to calculate the plurality of coefficients from the parameters $h_0$, $h_1$, $h_2$, $h_3$, and $h_4$ as:

$\mu_{0/0}=0;$ $\mu_{1/0}=h_4;$ $\mu_{2/0}=h_3;$ $\mu_{3/0}=h_3+h_4;$ $\mu_{4/0}=h_2;$ $\mu_{5/0}=h_2+h_4;$ $\mu_{6/0}=h_2+h_3;$ $\mu_{7/0}=h_2+h_3+h_4;$ $\mu_{8/0}=h_1;$ $\mu_{9/0}=h_1+h_4;$ $\mu_{10/0}=h_1+h_3;$ $\mu_{11/0}=h_1+h_3+h_4;$ $\mu_{12/0}=h_1+h_2;$ $\mu_{13/0}=h_1+h_2+h_4;$ $\mu_{14/0}=h_1+h_2+h_3;$ $\mu_{15/0}=h_1+h_2+h_3+h_4;$ $\mu_{0/1}=h_0;$ $\mu_{1/1}=h_0+h_4;$ $\mu_{2/1}=h_0+h_3;$ $\mu_{3/1}=h_0+h_3+h_4;$ $\mu_{4/1}=h_0+h_2;$ $\mu_{5/1}=h_0+h_2+h_4;$ $\mu_{6/1}=h_0+h_2+h_3;$ $\mu_{7/1}=h_0+h_2+h_3+h_4;$ $\mu_{8/1}=h_0+h_1;$ $\mu_{9/1}=h_0+h_1+h_4;$ $\mu_{10/1}=h_0+h_1+h_3;$ $\mu_{11/1}=h_0+h_1+h_3+h_4;$ $\mu_{12/1}=h_0+h_1+h_2;$ $\mu_{13/1}=h_0+h_1+h_2+h_4;$ $\mu_{14/1}=h_0+h_1+h_2+h_3;$ and $\mu_{15/1}=h_0+h_1+h_2+h_3+h_4.$

15. The program of claim 14, wherein the read channel is an APML channel and the plurality of parameters are calculated from a plurality of asymmetry values $p_1, p_2, p_3, n_0, n_1, n_2,$ and $n_3$ wherein $h_0$ is one (1), $h_1$ is $p_1$ minus $n_0$ ($p_1-n_0$), $h_2$ is $p_2$ minus $n_1$ ($p_2-n_1$), $h_3$ is $p_3$ minus $n_2$ ($p_3-n_2$), and $h_4$ is minus $n_3$ ($-n_3$).

16. The program of claim 14, wherein the read channel is a PR4 channel and $h_0$ is one (1), $h_1$ is zero (0), $h_2$ is minus one (-1), $h_3$ is zero (0), and $h_4$ is zero (0).

17. The program of claim 14, wherein the read channel is an EPR4 channel and $h_0$ is one (1), $h_1$ is one (1), $h_2$ is minus one (-1), $h_3$ is minus one (-1), and $h_4$ is zero (0).

18. The program of claim 14, wherein the read channel is an EEPR4 channel and $h_0$ is one (1), $h_1$ is two (2), $h_2$ is zero (0), $h_3$ is minus two (-2), and $h_4$ is one (1).

19. A method for deploying computer infrastructure, comprising integrating computer-readable code into a computing system, wherein the code is stored on a storage device and executed on a processor to perform the following:

initializing j plus one (j+1) path memories pm each configured as a string of binary values;

calculating a plurality of coefficients optimized for an asymmetric waveform;

calculating j plus one (j+1) first specified likelihood functions m(n) as $m_{k-1}(n)+2\mu_{n/r}y_k-\mu_{n/r}^2$ and j plus one (j+1) second specified likelihood functions m(n+1) as $m_{k-1}(n+1)+2\mu_{n+1/r}y_k-\mu_{n+1/r}^2$ for each specified value of n from zero (0) to j using a computation module comprising hardware circuits, wherein k minus one (K+1) refers to the time slice immediately prior to the current time slice, $m_{(k-1)}(n)$ is the first specified branch metric, $m_{(k-1)}(n+1)$ is the second specified branch metric for the prior time slice k for each specified value of n from zero (0) to j, r is a specified coefficient identifier, $y_k$ is a digital input value of a current time slice of a read channel analog value, and $\mu_{n/r}$, and $\mu_{n+1/r}$ are coefficients corresponding to m(n) and m(n+1);

calculating j plus one (j+1) third specified branch metrics referred to as $m_k(q)$ where q is a specified integer from zero (0) to j as the maximum of a plurality of first and second specified likelihood functions;

calculating j plus one (j+1) third specified path memories $pm_k(q)$ for each q where q is the specified integer from zero (0) to j as the first specified path memory for the prior time slice $pm_{(k-1)}(n)$ shifted one bit if the first specified likelihood function is greater than the second specified likelihood function else as the second path memory for the prior time slice $pm_{(k-1)}(n+1)$ shifted one bit if the first likelihood function is less than the second likelihood function for each path memory $pm_{(k-1)}(n)$ for each specified value of n; and identifying a data output value of a read channel from at least one path memory of the current time slice.

20. The method of claim 19, wherein j is equal to fifteen (15) and further comprising calculating sixteen (16) branch metrics $m_k(q)$ using equations comprising:

$m_k(0)=\max\{m_{k-1}(0)+2\mu_{0/0}y_k-\mu_{0/0}^2; m_{k-1}(1)+2\mu_{1/0}y_k-\mu_{1/0}^2\};$ $m_k(1)=\max\{m_{k-1}(2)+2\mu_{2/0}y_k-\mu_{2/0}^2; m_{k-1}(3)+2\mu_{3/0}y_k-\mu_{3/0}^2\};$ $m_k(2)=\max\{m_{k-1}(4)+2\mu_{4/0}y_k-\mu_{4/0}^2; m_{k-1}(5)+2\mu_{5/0}y_k-\mu_{5/0}^2\};$ $m_k(3)=\max\{m_{k-1}(6)+2\mu_{6/0}y_k-\mu_{6/0}^2; m_{k-1}(7)+2\mu_{7/0}y_k-\mu_{7/0}^2\};$ $m_k(4)=\max\{m_{k-1}(8)+2\mu_{8/0}y_k-\mu_{8/0}^2; m_{k-1}(9)+2\mu_{9/0}y_k-\mu_{9/0}^2\};$ $m_k(5)=\max\{m_{k-1}(10)+2\mu_{10/0}y_k-\mu_{10/0}^2; m_{k-1}(11)+2\mu_{11/0}y_k-\mu_{11/0}^2\};$ $m_k(6)=\max\{m_{k-1}(12)+2\mu_{12/0}y_k-\mu_{12/0}^2; m_{k-1}(13)+2\mu_{13/0}y_k-\mu_{13/0}^2\};$ $m_k(7)=\max\{m_{k-1}(14)+2\mu_{14/0}y_k-\mu_{14/0}^2; m_{k-1}(15)+2\mu_{15/0}y_k-\mu_{15/0}^2\};$ $m_k(8)=\max\{m_{k-1}(0)+2\mu_{0/1}y_k-\mu_{0/1}^2; m_{k-1}(1)+2\mu_{1/1}y_k-\mu_{1/1}^2\};$ $m_k(9)=\max\{m_{k-1}(2)+2\mu_{2/1}y_k-\mu_{2/1}^2; m_{k-1}(3)+2\mu_{3/1}y_k-\mu_{3/1}^2\};$ $m_k(10)=\max\{m_{k-1}(4)+2\mu_{4/1}y_k-\mu_{4/1}^2; m_{k-1}(5)+2\mu_{5/1}y_k-\mu_{5/1}^2\};$ $m_k(11)=\max\{m_{k-1}(6)+2\mu_{6/1}y_k-\mu_{6/1}^2; m_{k-1}(7)+2\mu_{7/1}y_k-\mu_{7/1}^2\};$ $m_k(12)=\max\{m_{k-1}(8)+2\mu_{8/1}y_k-\mu_{8/1}^2; m_{k-1}(9)+2\mu_{9/1}y_k-\mu_{9/1}^2\};$ $m_k(13)=\max\{m_{k-1}(10)+2\mu_{10/1}y_k-\mu_{10/1}^2; m_{k-1}(11)+2\mu_{11/1}y_k-\mu_{11/1}^2\};$ $m_k(14)=\max\{m_{k-1}(12)+2\mu_{12/1}y_k-\mu_{12/1}^2; m_{k-1}(13)+2\mu_{13/1}y_k-\mu_{13/1}^2\};$ and $m_k(15)=\max\{m_{k-1}(14)+2\mu_{14/1}y_k-\mu_{14/1}^2; m_{k-1}(15)+2\mu_{15/1}y_k-\mu_{15/1}^2\}.$

21. The method of claim 20, further comprising calculating the plurality of coefficients from a plurality of parameters $h_0$, $h_1$, $h_2$, $h_3$, and $h_4$ as:

$\mu_{0/0}=0;$ $\mu_{1/0}=h_4;$ $\mu_{2/0}=h_3;$ $\mu_{3/0}=h_3+h_4;$ $\mu_{4/0}=h_2;$ $\mu_{5/0}=h_2+h_4;$ $\mu_{6/0}=h_2+h_3;$ $\mu_{7/0}=h_2+h_3+h_4;$ $\mu_{8/0}=h_1;$ $\mu_{9/0}=h_1+h_4;$ $\mu_{10/0}=h_1+h_3;$ $\mu_{11/0}=h_1+h_3+h_4;$ $\mu_{12/0}=h_1+h_2;$ $\mu_{13/0}=h_1+h_2+h_4;$ $\mu_{14/0}=h_1+h_2+h_3;$ $\mu_{15/0}=h_1+h_2+h_3+h_4;$ $\mu_{0/1}=h_0;$ $\mu_{1/1}=h_0+h_4;$ $\mu_{2/1}=h_0+h_3;$ $\mu_{3/1}=h_0+h_3+h_4;$ $\mu_{4/1}=h_0+h_2;$ $\mu_{5/1}=h_0+h_2+h_4;$ $\mu_{6/1}=h_0+h_2+h_3;$ $\mu_{7/1}=h_0+h_2+h_3+h_4;$ $\mu_{8/1}=h_0+h_1;$ $\mu_{9/1}=h_0+h_1+h_4;$ $\mu_{10/1}=h_0+h_1+h_3;$ $\mu_{11/1}=h_0+h_1+h_3+h_4;$ $\mu_{12/1}=h_0+h_1+h_2;$ $\mu_{13/1}=h_0+h_1+h_2+h_4;$ $\mu_{14/1}=h_0+h_1+h_2+h_3;$ and $\mu_{15/1}=h_0+h_1+h_2+h_3+h_4.$

22. An apparatus for asymmetric maximum likelihood detection, the apparatus comprising:

means for initializing j plus one (j+1) path memories pm configured as a string of binary values;

means for calculating a plurality of coefficients optimized for an asymmetric waveform;

means for calculating i plus one (j+1) first specified likelihood functions m(n) as $m_{k-1}(n)+2\mu_{n/r}y_k-\mu_{n/r}^2$ and j plus one (j+1) second specified likelihood functions m(n+1) as $m_{k-1}(n+1)+2\mu_{n+1/r}y_k-\mu_{n+1/r}^2$ for each specified value of n from zero (0) to j, wherein k minus one (k+1) refers to the time slice immediately prior to the current time slice, $m_{(k-1)}(n)$ is the first specified branch metric, $m_{(k+1)}(n+1)$ is the second specified branch metric for the prior time slice k for each specified value of n from zero (0) to j, r is a specified coefficient identifier, $y_k$ is a digital input value of a current time slice of a read channel analog value, and $\mu_{n/r}$ and $\mu_{n+1/r}$ are coefficients corresponding to m(n) and m(n+1);

means for calculating j plus one (j+1) third specified branch metrics referred to as $m_k(q)$ where q is a specified integer from zero (0) to j as the maximum of the first and second specified likelihood functions;

means for calculating j plus one (j+1) third specified path memories $pm_k(q)$ for each q where q is the specified integer from zero (0) to j as the first specified path memory for the prior time slice $pm_{(k-1)}(n)$ shifted one bit if the first specified likelihood function is greater than the second specified likelihood function else as the second path memory for the prior time slice $pm_{(k-1)}(n-1)$ shifted one bit if the first likelihood function is less than the second likelihood function for each path memory $pm_{(k-1)}(n)$ for each specified value of n; and means for identifying a data output value of a read channel from the path memory of the current time slice.

* * * * *